(12) United States Patent
Washizawa

(10) Patent No.: US 8,817,197 B2
(45) Date of Patent: Aug. 26, 2014

(54) DISPLAY DEVICE AND ELECTRONIC APPARATUS

(75) Inventor: Takehito Washizawa, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 13 days.

(21) Appl. No.: 13/023,869

(22) Filed: Feb. 9, 2011

(65) Prior Publication Data

US 2011/0199549 A1 Aug. 18, 2011

(30) Foreign Application Priority Data

Feb. 16, 2010 (JP) ................................ P2010-030983

(51) Int. Cl.
| | | |
|---|---|---|
| G02F 1/136 | (2006.01) | |
| G02F 1/1333 | (2006.01) | |
| G02F 1/1335 | (2006.01) | |
| G02B 27/22 | (2006.01) | |
| H04N 13/04 | (2006.01) | |
| G02B 5/20 | (2006.01) | |

(52) U.S. Cl.
CPC ........ G02B 27/2214 (2013.01); H04N 13/0411 (2013.01); G02B 5/201 (2013.01); H04N 13/0409 (2013.01)
USPC .............. 349/15; 349/421; 349/122; 359/462

(58) Field of Classification Search
USPC ................................ 349/15, 42, 122; 359/462
See application file for complete search history.

(56) References Cited

U.S. PATENT DOCUMENTS

| | | | |
|---|---|---|---|
| 7,697,105 B2 | 4/2010 | Koyama et al. | |
| 2003/0107804 A1* | 6/2003 | Dolgoff ........................ | 359/463 |
| 2005/0243253 A1 | 11/2005 | Imai et al. | |
| 2007/0197289 A1* | 8/2007 | Fujimoto et al. ............... | 463/32 |
| 2008/0158500 A1* | 7/2008 | Kawata et al. ................. | 349/187 |
| 2009/0086150 A1* | 4/2009 | Koyama et al. ............... | 349/153 |
| 2010/0182530 A1* | 7/2010 | Fujikawa ........................ | 349/58 |
| 2010/0321621 A1* | 12/2010 | Kikuchi et al. ............... | 349/122 |

FOREIGN PATENT DOCUMENTS

| | | |
|---|---|---|
| JP | 08-106070 | 4/1996 |
| JP | 2001-051263 | 2/2001 |
| JP | 2004-206089 | 7/2004 |
| JP | 2008-008934 | 1/2008 |
| JP | 2008-064918 | 3/2008 |
| JP | 2008-164702 | 7/2008 |
| JP | 2008-164703 | 7/2008 |
| WO | 2004011987 | 2/2004 |
| WO | 2007007552 | 1/2007 |

OTHER PUBLICATIONS

Japanese Office Action issued Oct. 29, 2013 in corresponding Japanese Patent Application No. 2010-030983.

* cited by examiner

*Primary Examiner* — Jerry Blevins
(74) *Attorney, Agent, or Firm* — K&L Gates LLP

(57) ABSTRACT

A display device includes: an element substrate having a transistor element formed on a surface thereof; an opposing substrate which is disposed to face the element substrate; and a parallax barrier pattern which is directly formed on the surface of either substrate of the element substrate or the opposing substrate at the side opposite to the transistor element side.

12 Claims, 6 Drawing Sheets

400
420(100,101,102,103,104)
410(100,101,102,103,104)

500
510(100,101,102,103,104)

600
610(100,101,102,103,104)

DISPLAY DEVICE AND ELECTRONIC APPARATUS

CROSS REFERENCES TO RELATED APPLICATIONS

The present application claims priority to Japanese Priority Patent Application JP 2010-030983 filed in the Japan Patent Office on Feb. 16, 2010, the entire contents of which is hereby incorporated by reference.

BACKGROUND

The present application relates to a display device and an electronic apparatus, particularly, to a display device and an electronic apparatus including a parallax barrier pattern.

Hitherto, a display device and an electronic apparatus including a parallax barrier pattern are known (e.g., see JP-A-2004-206089).

JP-A-2004-206089 discloses a multiple view display (a display device) which includes a TFT substrate formed with a thin film transistor (TFT), a counter substrate (a color filter (CF) substrate) provided to face the TFT substrate, and a liquid crystal layer pinched between the TFT substrate and the counter substrate. Furthermore, a polarizer is formed on the surface of the counter substrate at the side opposite to the liquid crystal layer. A parallax barrier for displaying a three-dimensional (3D) image or two different images is disposed on the surface of the polarizer at the side opposite to the counter substrate. Furthermore, the parallax barrier includes a parallax barrier substrate and a parallax barrier aperture array (a parallax barrier pattern) having a plurality of opening portions (slits) formed on the surface of the parallax barrier substrate. In addition, although it is not clearly described in JP-A-2004-206089, the polarizer formed on the surface of the counter substrate and the parallax barrier aperture array of the parallax barrier are attached to each other using an adhesive layer or the like, whereby the counter substrate and the parallax barrier are fixed to each other.

SUMMARY

However, in the display device described in JP-A-2004-206089, in a case where the polarizer and the parallax barrier aperture array are attached to each other using an adhesive layer, there is a problem in that there are cases of positional deviation of the parallax barrier aperture array with respect to the pixel or the color filter provided at the counter substrate side.

Thus, it is desirable to provide a display device and an electronic apparatus capable of suppressing the positional deviation of the parallax barrier pattern.

According to an embodiment, there is provided a display device which includes an element substrate having a transistor element formed on a surface thereof, an opposing substrate which is disposed to face the element substrate so as to pinch the transistor element therebetween, and a parallax barrier pattern which is directly formed on the surface of either substrate of the element substrate or the opposing substrate at the side opposite to the transistor element side.

In the display device according to the embodiment, by directly forming the parallax barrier pattern on the surface of either substrate of the element substrate or the opposing substrate at the side opposite to the transistor element side, for example, unlike a case where a separate layer such as an adhesive layer is provided between the surface of either substrate of the element substrate or the opposing substrate at the side opposite to the transistor element and the parallax barrier pattern to dispose the parallax barrier pattern on the substrate, an extra layer does not exist between the parallax barrier pattern and the substrate, and thus the positional deviation of the parallax barrier pattern can be suppressed. Furthermore, unlike a case where the separate layer is provided between the parallax barrier pattern and either substrate of the element substrate or the opposing substrate, it is possible to suppress the gap between the parallax barrier pattern and either substrate of the element substrate or the opposing substrate from becoming irregular due to the thickness (film thickness irregularity) of the layer.

In the display device according to the embodiment, preferably, the parallax barrier pattern is formed to directly come into contact with the surface of either substrate of the element substrate or the opposing substrate at the side opposite to the transistor element side without the adhesive layer. If the display device is configured in this manner, unlike the case where the parallax barrier pattern is formed on the surface of either substrate of the side opposite to the transistor element side via the adhesive layer, the adhesive layer may not be provided, and thus the positional deviation of the parallax barrier pattern can be suppressed. Furthermore, unlike the case where the adhesive layer is provided between the parallax barrier pattern and either substrate of the element substrate or the opposing substrate, it is possible to suppress the gap between the parallax barrier pattern and either substrate of the element substrate or the opposing substrate from becoming irregular due to the thickness (film thickness irregularity) of the adhesive layer.

In the display device according to the embodiment, preferably, the end portion of the parallax barrier pattern is formed further to the inner side than the end portion of either substrate of the element substrate or the opposing substrate formed with the parallax barrier pattern. If the display device is configured in this manner, for example, unlike a case where the end portion of the parallax barrier pattern is formed at a position where it overlaps with the end portion of the element substrate and the opposing substrate when seen from the top plane thereof, it is possible to easily confirm the division place upon dividing the element substrate and the opposing substrate in a large plate state in the manufacturing process of the display device.

In the display device according to the embodiment, preferably, the thickness of either substrate of the element substrate or the opposing substrate, on which the parallax barrier pattern is formed, is smaller than that of the other substrate of the element substrate or the opposing substrate on which the parallax barrier pattern is not formed. If the display device is configured in this manner, for example, when a layer such as a color filter is formed on the surface of either substrate of the element substrate or the opposing substrate formed with the parallax barrier pattern at the side opposite to the parallax barrier pattern side, the distance between the parallax barrier pattern and the color filter becomes smaller, and thus it is possible to easily constitute a display device of two screen display in which the distance from the color filter and the parallax barrier pattern is small.

In the display device according to the embodiment, preferably, the parallax barrier pattern is directly formed on the surface of the opposing substrate at the side opposite to the transistor element side. If the display device is configured in this manner, unlike a case where an adhesive layer or the like is provided between the parallax barrier pattern and the opposing substrate, for example, it is possible to suppress the gap between the parallax barrier pattern and the color filter from becoming irregular due to the thickness (film thickness irregularity) of the adhesive layer.

In the display device according to the embodiment, preferably, the parallax barrier pattern is directly formed on the surface of the element substrate at the side opposite to the transistor element side. If the display device is configured in this manner, unlike a case where an adhesive layer or the like is provided between the parallax barrier pattern and the element substrate, for example, it is possible to suppress the gap between the parallax barrier pattern and the transistor element from becoming irregular due to the thickness (film thickness irregularity) of the adhesive layer.

The display device according to the embodiment, preferably, further includes a protective film which is formed on the surface of the parallax barrier pattern at the side opposite to the transistor element side, and a polarizing plate which is formed on the surface of the protective film at the side opposite to the transistor element side. If the display device is configured in this manner, since the surface of the parallax barrier pattern is protected by the protective film during manufacturing process of the display device, it is possible to suppress scratching of the surface of the parallax barrier pattern and to improve the surface durability (mechanical strength) of the display device. Furthermore, by forming the protective film on the surface of the parallax barrier pattern, the surface of the substrate on which the parallax barrier pattern is formed becomes a flat surface shape, which makes it possible to easily form the polarizing plate on the surface of the protective film.

The display device according to the embodiment, preferably, further includes a polarizing plate which is formed on the surface of the parallax barrier pattern at the side opposite to the transistor element side, and a protective film which is formed on the surface of the polarizing plate at the side opposite to the transistor element side. If the display device is configured in this manner, since the surface of the polarizing plate is protected by the protective film, it is possible to suppress scratching of the surface of the polarizing plate and to improve the surface durability (mechanical strength) of the display device.

In the display device according to the embodiment, preferably, the parallax barrier pattern is formed of either a metallic layer or a resin layer. If the display device is configured in this manner, it is possible to obtain a display device that is formed with a parallax barrier pattern formed of a metallic layer or a parallax barrier pattern formed of a resin layer.

In this case, preferably, the parallax barrier pattern is formed of a metallic layer having a plurality of opening portions which are directly formed on the surface of the opposing substrate at the side opposite to the transistor element side and is conductive to the element substrate side. If the display device is configured in this manner, the static electricity from the outside of the display device can be shielded by the parallax barrier pattern formed of the metallic layer, and the static electricity can escape to the element substrate side via the parallax barrier pattern. As a result, since it is not necessary to provide a shield layer separately from the parallax barrier pattern on the surface of the opposing substrate at the side opposite to the transistor element side, the number of the components can be reduced accordingly and the structure of the display device can be simplified.

In the display device in which the parallax barrier pattern is conductive to the element substrate side, preferably, a part of the parallax barrier pattern is configured so as to be exposed, and a conduction member for conducting the exposed portion of the parallax barrier pattern to the element substrate side is further included. If the display device is configured in this manner, the parallax barrier pattern can be easily connected to the conduction member and the static electricity can escape to the element substrate side via the parallax barrier pattern.

According to another embodiment, there is provided an electronic apparatus which includes a display device having any one of the above configurations. If the electronic apparatus is configured in this manner, it is possible to obtain an electronic apparatus that has a liquid crystal display device capable of suppressing the positional deviation of the parallax barrier pattern relative to the substrate.

Additional features and advantages are described herein, and will be apparent from the following Detailed Description and the figures.

DETAILED DESCRIPTION

Embodiments of the present application will be described below in detail with reference to the drawings.

First Embodiment

A configuration of a liquid crystal display device 100 according to a first embodiment will be described with reference to FIGS. 1 to 3. In addition, in the first embodiment, an example in which the present application is applied to a liquid crystal display device 100 of a FFS (Fringe Field Switching) mode will be described. Furthermore, the liquid crystal display device 100 is an example of a "display device" according to the present application.

Figure 1:
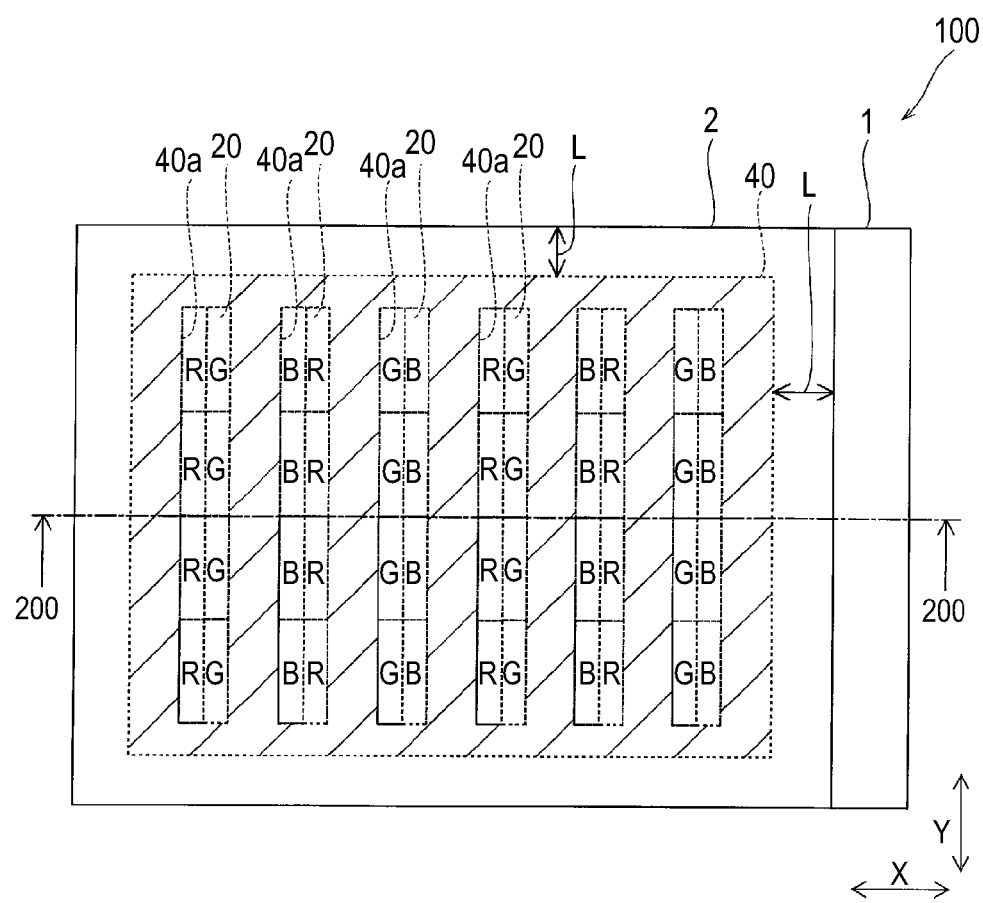
FIG. 1 is a top plane view of a liquid crystal display device according to a first embodiment.
Figure 2:
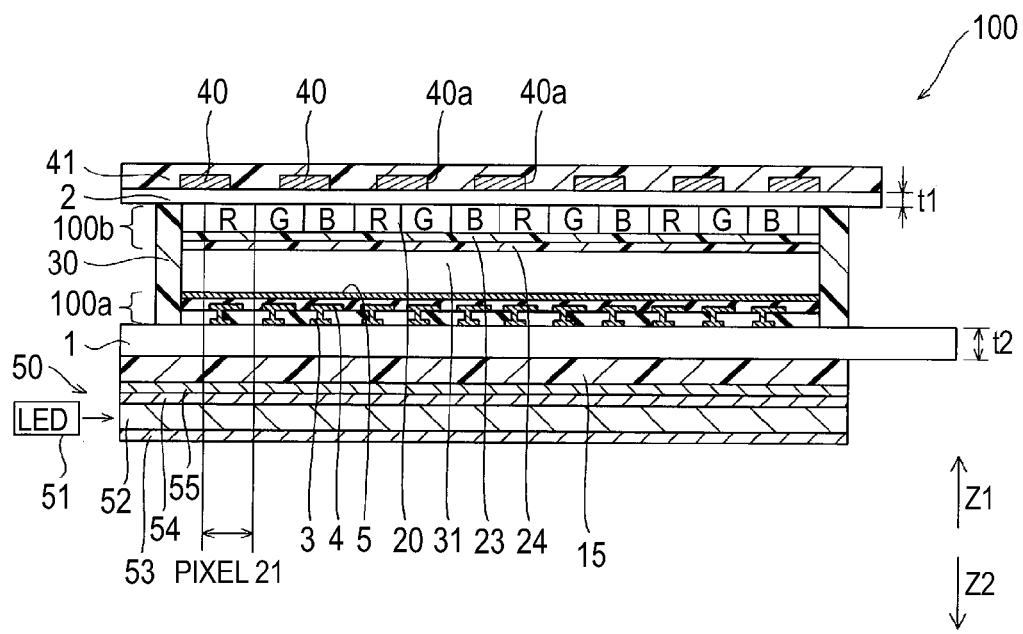
FIG. 2 is a cross-sectional view taken along line 200-200 of FIG. 1.

In the liquid crystal display device 100 according to the first embodiment, as shown in FIGS. 1 and 2, a TFT substrate 1 formed of glass and a CF (a color filter) substrate 2 formed of glass are disposed so as to face each other. As shown in FIG. 2, the thickness t1 of the CF substrate 2 is about 100 μm, and the thickness t2 of the TFT substrate 1 is about 600 μm. That is, the CF substrate 2 is formed to be thinner than the TFT substrate 1. As a result, the configuration is such that the distance between a color filter (CF) 20 described later and a parallax barrier pattern 40 described later is reduced. In addition, upon performing a two screen display that displays two different images (pictures) by separating the images (pictures), the distance between the color filter 20 and the parallax barrier pattern 40 is about 100 μm. Moreover, upon performing a three-dimensional (3D) display by separating the images (pictures), the distance between the color filter 20 and the parallax barrier pattern 40 is about 1 mm. That is, upon performing the two screen display, it is necessary to considerably reduce the distance between the color filter 20 and the parallax barrier pattern 40 as compared to the case of performing the three-dimensional display. Furthermore, on the surface of a Z1 direction side of the TFT substrate 1, a thin film transistor (TFT) 3 for pixel selection, a pixel electrode 4, and a common electrode 5 are formed.

Figure 3:
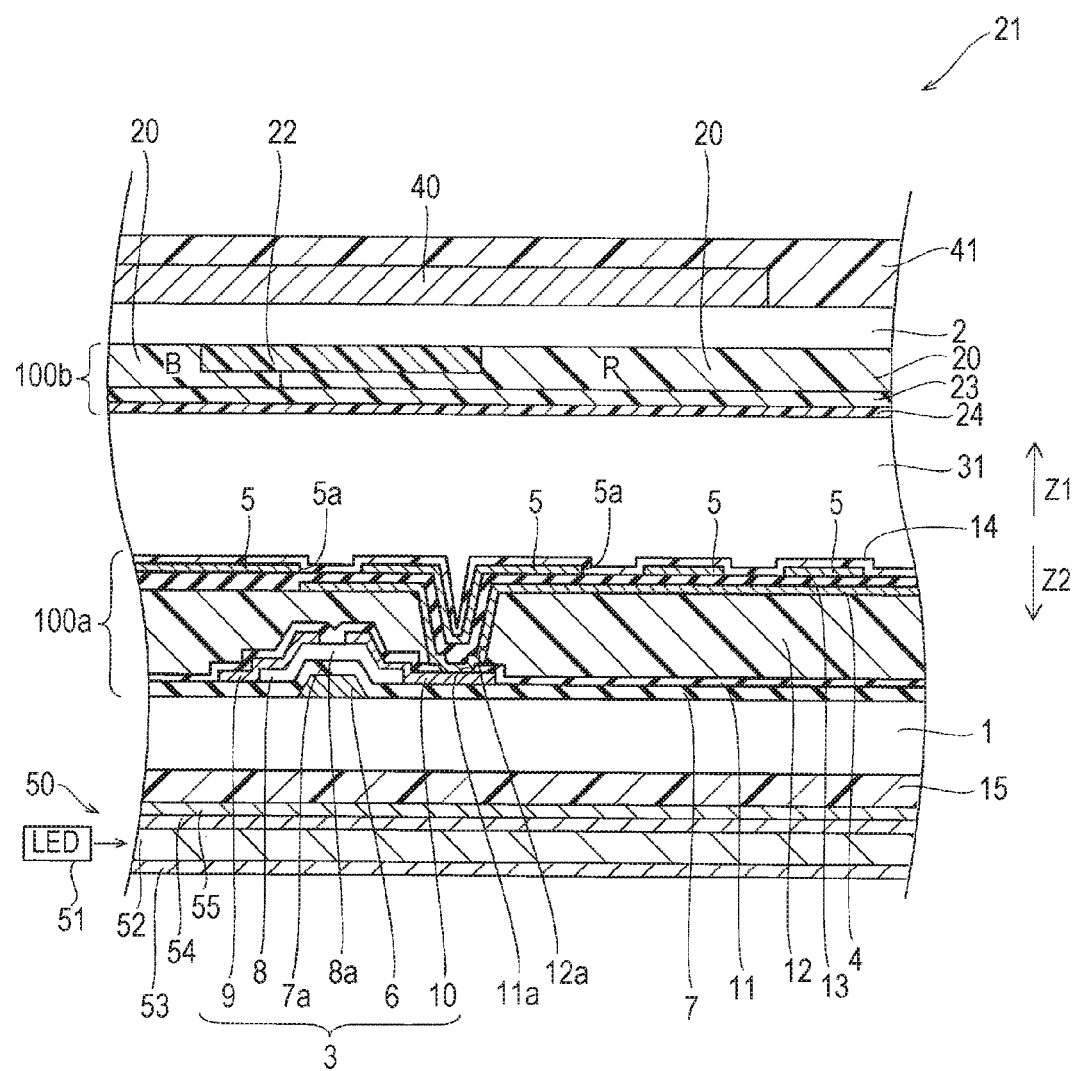
FIG. 3 is a cross-sectional view of a pixel of a liquid crystal display device formed with a parallax barrier pattern according to the first embodiment.

Furthermore, as a detailed cross section structure of one pixel, as shown in FIG. 3, a gate electrode 6 is provided on the surface of the Z1 direction side of the TFT substrate 1. Moreover, an insulation film 7 including a gate insulation film 7*a* formed of SiN film, SiO2 film or the like is formed on the gate electrode 6 and on the TFT substrate 1. A semiconductor layer 8 including two layer structure (not shown) of a lower layer of a-Si layer and an upper layer of n+a-Si layer having the n-type conductivity is formed so as to overlap with the gate electrode 6 via the gate insulation film 7*a* when seen in the plane view.

A source electrode 9 and a drain electrode 10 are formed on the semiconductor layer 8 so as to overlap with the gate electrode 6 when seen in the plane view. Furthermore, when seen in the plane view, an area of the semiconductor layer 8 which is pinched between the source electrode 9 and the drain electrode 10 functions as a channel area 8*a*. In addition, the thin film transistor (TFT) 3 for the pixel selection includes the gate electrode 6, the gate insulation film 7*a*, the semiconductor layer 8, the source electrode 9, and the drain electrode 10.

Furthermore, an interlayer insulation film 11 formed of SiN layer or the like is formed so as to cover the source electrode 9, the drain electrode 10 and the insulation film 7. On the interlayer insulation film 11, a contact hole 11*a* is formed in an area corresponding to the drain electrode 10. On the surface of the interlayer insulation film 11, a planarization film 12 formed of an organic film such as an acrylic resin is formed. Furthermore, a contact hole 12*a* is formed in the planarization film 12. Moreover, the pixel electrode 4 is formed from a transparent electrode such as ITO (Indium Tin Oxide) or IZO (Indium Zinc Oxide) so as to be connected to the drain electrode 10 on the surface of the planarization film 12 via the contact hole 11*a* and the contact hole 12*a*.

Furthermore, on the surfaces of the planarization film 12 and the pixel electrode 4, a passivation film 13 formed of SiO2 or SiN film formed at a low temperature is formed. Furthermore, the common electrode 5 is formed from the transparent electrode such as ITO or IZO on the surface of the passivation film 13. A plurality of opening portions 5*a* are provided in the common electrode 5 and the configuration is such that an electric field is generated between the pixel electrode 4 and the common electrode 5 via the opening portion 5*a*. As described above, a FFS (Fringe Field Switching) mode of liquid crystal display device 100 is configured, in which a liquid crystal is driven by the electric field of the transverse direction between the pixel electrode 4 and the common electrode 5.

Moreover, on the common electrode 5, an alignment film 14 formed of an organic film such as polyimide is formed. The alignment film 14 is formed to cover the surface of the common electrode 5 and is formed to come into contact with the passivation film 13 via the opening portion 5*a* in the common electrode 5. Moreover, a polarizing plate 15 is provided on the surface of a Z2 direction side of the TFT substrate 1. In this manner, the thin film transistor 3, the interlayer insulation film 11, the planarization film 12, the pixel electrode 4, the passivation film 13, the common electrode 5, the alignment film 5, and the alignment film 14 constitute an element and insulation film forming portion 100*a*.

Moreover, as shown in FIG. 2, on the surface of the Z2 direction side of the CF substrate 2, red (R), green (G), and blue (B) color filters 20 are formed. In addition, a plurality of pixels 21 are provided on the liquid crystal display device 100 and the color filters 20 are provided for each pixel 21.

Moreover, as shown in FIG. 3, on the surface of the Z2 direction side of the CF substrate 2, a black matrix 22 formed of resin or the like is formed. The black matrix 22 is formed on the boundary between the pixels 21 when seen in the plane view and is formed in the shape of a matrix. Moreover, on the surface of the Z2 direction side of the black matrix 22 and the color filter 20, an over coat layer 23 as a protective film is formed. Furthermore, on the surface of the Z2 direction side of the over coat layer 23, an alignment film 24 formed of an organic film such as polyimide or the like is formed. In this manner, the color filter 20, the black matrix 22, the over coat layer 23 and the alignment layer 24 constitute a resin layer forming portion 100*b*.

Moreover, the TFT substrate 1 and the CF substrate 2 are bonded to each other by a seal material 30 (see FIG. 2), and a liquid crystal layer 31 is encapsulated between the alignment film 14 formed in the Z1 direction side of the TFT substrate 1 and the alignment film 24 formed in the Z2 direction side of the CF substrate 2.

Herein, in the first embodiment, as shown in FIG. 2, the parallax barrier pattern 40 is formed to directly come into contact with the surface of the Z1 direction side of the CF substrate 2 without an adhesive layer. Furthermore, the parallax barrier pattern 40 is formed on the surface of the thin CF substrate 2, but after the thick CF substrate 2 is thinned by a machining process in advance, the parallax barrier pattern 40 is formed. Moreover, after the black matrix 22, the color filter 20, and the over coat layer 23 are formed on the surface of the Z2 direction side of the CF substrate 2 and are bonded to the TFT substrate 1, the surface of the Z1 direction side of the CF substrate 2 is thinned by a machining process again, and then the parallax barrier pattern 40 is formed. The forming of the parallax barrier pattern 40 last in this manner means it can be relatively easily formed on the CF substrate 2 which is considerably thinner than the substrate thickness of the TFT substrate 1, compared to a case where the parallax barrier pattern 40 is formed on the CF substrate 2 in the first place. Furthermore, the parallax barrier pattern 40 is formed of a metallic layer such as chrome (Cr), aluminum (Al), silver (Ag) or nickel (Ni), a resin layer or the like and has the light shielding property. Furthermore, as shown in FIG. 1, in the parallax barrier pattern 40, a plurality of substantially rectangular openings (slits) 40*a* formed to extend in a Y direction are provided. The configuration is such that light is shielded by the parallax barrier pattern 40 between the opening portion 40*a* and the opening portion 40*a*.

Furthermore, the parallax barrier pattern 40 is configured so that two colors among three colors (red (R), green (G) and blue (B)) of the color filter 20 can be ascertained from the opening portion 40*a* of the parallax barrier pattern 40. Furthermore, the end portions of the parallax barrier pattern 40 in the X direction and the Y direction are formed further to the inner side than the end portions of the CF substrate 2 in the X direction and the Y direction by a width L of about 0.5 mm when seen in the plane view. Furthermore, as shown in FIG. 2, the polarizing plate 41 is provided on the surface of the Z1 direction side of the parallax barrier pattern 40.

Moreover, a backlight 50 is provided on the surface of the Z2 direction side of the polarizing plate 15 formed on the surface of the Z2 direction side of the TFT substrate 1, so that light from the backlight 50 is emitted from the backlight 50 from the TFT substrate 1 toward the CF substrate 2 (the Z1 direction side). In addition, the backlight 50 includes a LED (Light Emitting Diode) 51, a light guide plate 52 for guiding the light from the LED 51, a reflection sheet 53 provided on the surface of the Z2 direction side of the light guide plate 52, a diffusion sheet 54 provided on the surface of the Z1 direction of the light guide plate 52, and a prism sheet 55 provided on the surface of the Z1 direction side of the diffusion sheet. The diffusion sheet 54 has the function of uniformly diffusing the light, which is irradiated from the LED 51 via the light guide plate 52, toward the prism sheet 55. The prism sheet 55 has the function of transmitting the light from the diffusion sheet 54 to the TFT substrate 1 side and concentrating the light.

As described above, in the first embodiment, by directly forming the parallax barrier pattern 40 on the surface of the CF substrate 2 at the side opposite to the thin film transistor 3 side, for example, unlike the case where a separate layer such as an adhesive layer is provided between the surface of the CF substrate 2 at the side opposite to the thin film transistor 3 side and the parallax barrier pattern 40 to dispose the parallax barrier pattern 40 on the CF substrate 2, an extra layer does not exist between the parallax barrier pattern 40 and the CF substrate 2, which makes it possible to suppress the positional deviation of the parallax barrier pattern 40. Furthermore, unlike the case where a separate layer is provided between the parallax barrier pattern 40 and the CF substrate 2, it is possible to suppress the irregularity of the gap between the parallax barrier pattern 40 and the CF substrate 2 due to the thickness (film thickness irregularity) of the layer.

Furthermore, in the first embodiment, as described above, by forming the parallax barrier pattern 40 so as to directly come into contact with the surface of the CF substrate 2 at the side opposite to the thin film transistor 3 side without an adhesive layer, unlike the case where the parallax barrier pattern 40 is formed on the surface of the CF substrate 2 at the side opposite to the thin film transistor 3 side via an adhesive layer, the adhesive layer may not be provided, and thus the positional deviation of the parallax barrier pattern 40 can be suppressed. Moreover, unlike the case where the adhesive layer is provided between the parallax barrier pattern 40 and the CF substrate 2, it is possible to suppress the irregularity of the gap between the parallax barrier pattern 40 and the CF substrate 2 due to the thickness (film thickness irregularity) of the adhesive layer.

Furthermore, as described above, in the first embodiment, by forming the end portion of the parallax barrier pattern 40 further to the inner side than the end portion of the CF substrate 2 to be formed with the parallax barrier pattern 40, for example, unlike the case where the end portion of the parallax barrier pattern 40 is formed in a position where it overlaps with the end portion of the CF substrate 2 when seen in the plane view, it is possible to easily confirm the division place upon dividing the CF substrate 2 in a large plate state in the manufacturing process of the liquid crystal display device 100.

Furthermore, in the first embodiment, as described above, the thickness t1 of the CF substrate 2 formed with the parallax barrier pattern 40 is made to be smaller than the thickness t2 of the TFT substrate 1 on which the parallax barrier pattern 40 is not formed, whereby the distance between the parallax barrier pattern 40 and the color filter 20 is reduced. Thus, it is possible to easily constitute the liquid crystal display device 100 of the two screen display in which the distance between the color filter 20 and the parallax barrier pattern 40 is short.

Moreover, in the first embodiment, as described above, by directly forming the parallax barrier pattern 40 on the surface of the CF substrate 2 at the side opposite to the thin film transistor 3 side, the distance between the parallax barrier pattern 40 and the color filter 20 becomes uniform. Thus, unlike the case of providing the adhesive layer or the like between the parallax barrier pattern 40 and the opposing substrate 2, it is possible to suppress the irregularity of the gap between the parallax barrier pattern 40 and the color filter 20 due to the thickness (film thickness irregularity) of the adhesive layer.

Moreover, in the first embodiment, as described above, by forming the parallax barrier pattern 40 of either the metallic layer or the resin layer, it is possible to obtain the liquid crystal display device 100 in which the parallax barrier pattern 40 formed of the metallic layer or the parallax barrier pattern 40 formed of the resin layer is formed.

Second Embodiment

Figure 4:
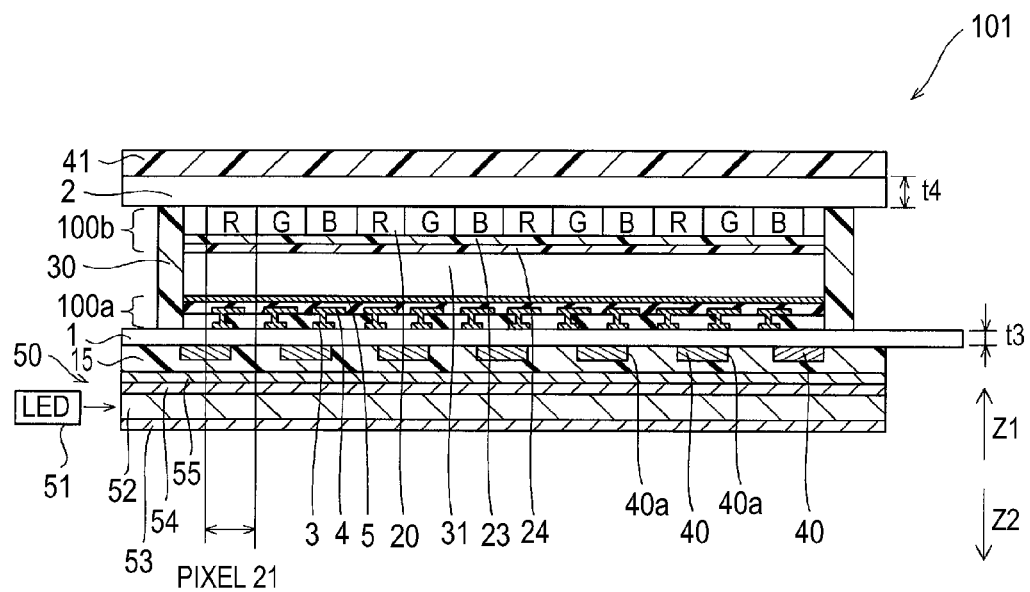
FIG. 4 is a cross-sectional view of a liquid crystal display device formed with a parallax barrier pattern according to a second embodiment.

Next, with reference to FIG. 4, unlike the first embodiment in which the parallax barrier pattern is formed to directly come into contact with the surface of the Z1 direction side (the opposite side of the liquid crystal layer) of the CF substrate, the parallax barrier pattern is formed to directly come into contact with the surface of the Z2 direction side (the opposite side of the liquid crystal layer) of the TFT substrate.

In a liquid crystal display device 101 according to a second embodiment, the parallax barrier pattern 40 is formed to directly come into contact with the surface of the Z2 direction side (the opposite side of the liquid crystal layer 31) of the TFT substrate 1. Furthermore, the thickness t3 of the TFT substrate 1 is about 100 μm, and the thickness t4 of the CF substrate 2 is about 600 μm. That is, the TFT substrate 1 is formed to be thinner than the CF substrate 2. As a result, the configuration is such that the distance between thin film transistor 3 and the parallax barrier pattern 40 is reduced. Furthermore, the polarizing plate 15 is formed on the surface of the Z2 direction side of the parallax barrier pattern 40. The backlight 50 is provided on the surface of the Z2 direction side of the polarizing plate 15. Moreover, other configurations of the second embodiment are the same as those of the first embodiment.

In the second embodiment, as described above, by directly forming the parallax barrier pattern 40 on the surface of the TFT substrate 1 at the side opposite to the thin film transistor 3 side, unlike the case of providing the adhesive layer or the like between the parallax barrier pattern 40 and the TFT substrate 1, it is possible to suppress the irregularity of the gap between the parallax barrier pattern 40 and the thin film transistor 3 due to the thickness (film thickness irregularity) of the adhesive layer.

In addition, other effects of the second embodiment are the same as those of the first embodiment.

Third Embodiment

Figure 5:
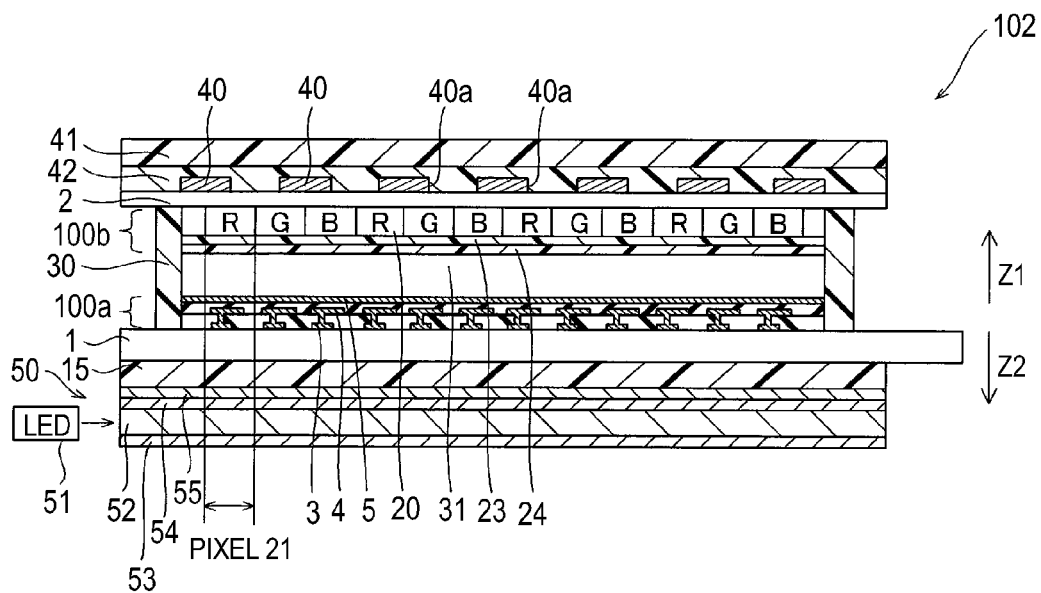
FIG. 5 is a cross-sectional view of a liquid crystal display device formed with a parallax barrier pattern according to a third embodiment.

Next, with reference to FIG. 5, unlike the first embodiment in which the polarizing plate is directly formed on the surface of the Z1 direction side (the opposite side of the liquid crystal layer) of the parallax barrier pattern, the polarizing plate is formed on the surface of the Z1 direction side (the opposite side of the liquid crystal layer) of the parallax barrier pattern via the protective film.

In a liquid crystal display device 102 according to a third embodiment, on the surface of the Z1 direction side of the parallax barrier pattern 40 which is formed to directly come into contact with the surface of Z1 direction side (the opposite side of the liquid crystal layer 31) of the CF substrate 2, a protective film 42 formed of resin or the like is formed. Specifically, the protective film 42 is formed of acrylic resin, epoxy-based transparent resin or the like, and is formed using an application method or the like. Furthermore, the polarizing plate 41 is formed on the surface of the Z1 direction side of the protective film 42. In addition, other configurations of the third embodiment are the same as those of the first embodiment.

In the third embodiment, as described above, by forming the protective film 42 on the surface of the parallax barrier pattern 40 at the side opposite to the thin film transistor 3 side and forming the polarizing plate 41 on the surface of the protective film 42 at the side opposite to the thin film transistor 3 side, during manufacturing process of the liquid crystal display device 102, the surface of the parallax barrier pattern 40 can be protected by the protective film 42. Thus, it is possible to suppress scratching of the surface of the parallax barrier pattern 40 and to improve the surface durability (the mechanical strength) of the liquid crystal display device 102. Moreover, by forming the protective film 42 on the surface of the parallax barrier pattern 40, the surface of the substrate, on which the parallax barrier pattern 40 is formed, becomes the flat surface, which makes it possible to easily form the polarizing plate 41 on the surface of the protective film 42.

In addition, other effects of the third embodiment are the same as those of the first embodiment.

Fourth Embodiment

Figure 6:
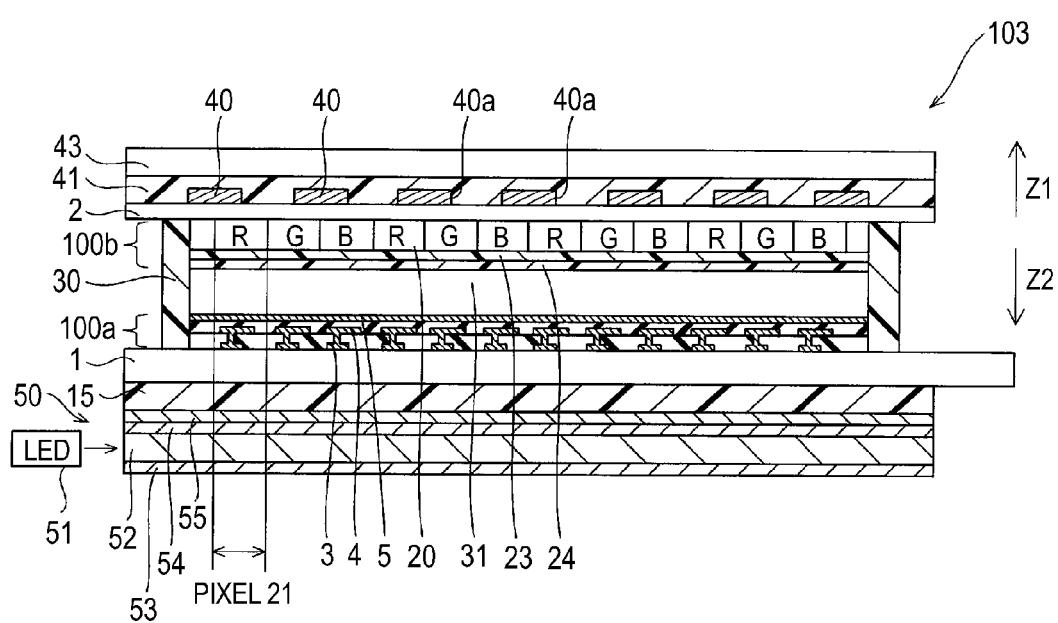
FIG. 6 is a cross-sectional view of a liquid crystal display device formed with a parallax barrier pattern according to a fourth embodiment.

Next, with reference to FIG. 6, unlike the first embodiment in which nothing is formed on the surface of the Z1 direction side of the polarizing plate on the surface of the CF substrate, the description will be given of an example that a protective cover is formed on the surface of the Z1 direction side of the polarizing plate on the surface of the CF substrate.

In a liquid crystal display device 103 according to a fourth embodiment, the parallax barrier pattern 40 is formed to directly come into contact with the surface of the Z1 direction side (the opposite side of the liquid crystal layer 31) of the CF substrate 2. Furthermore, the polarizing plate 41 is formed on the surface of the Z1 direction side (the opposite side of the liquid crystal layer 31) of the parallax barrier pattern 40. Moreover, a protective cover 43 formed of glass or the like is formed on the surface of the Z1 direction side (the opposite side of the liquid crystal layer 31) of the polarizing plate 41. In addition, other configurations of the fourth embodiment are the same as those of the first embodiment.

In the fourth embodiment, as described above, by forming the polarizing plate 41 on the surface of the parallax barrier pattern 40 at the side opposite to the thin film transistor 3 side and forming the protective cover 43 on the surface of the polarizing plate 41 at the side opposite to the thin film transistor 3 side, the surface of the polarizing plate 41 is protected by the protective cover 43. Thus, it is possible to suppress scratching of the surface of the polarizing plate 41 and improve the surface durability (the mechanical strength) of the liquid crystal display device 103.

In addition, other effects of the fourth embodiment are the same as those of the first embodiment.

Fifth Embodiment

Next, with reference to FIGS. 7 and 8, unlike the first embodiment in which the parallax barrier pattern formed on the surface of the CF substrate is not electrically connected to the TFT substrate side, the description will be given of an example in which the parallax barrier pattern formed on the surface of the CF substrate is electrically connected to the TFT substrate side.

Figure 7:
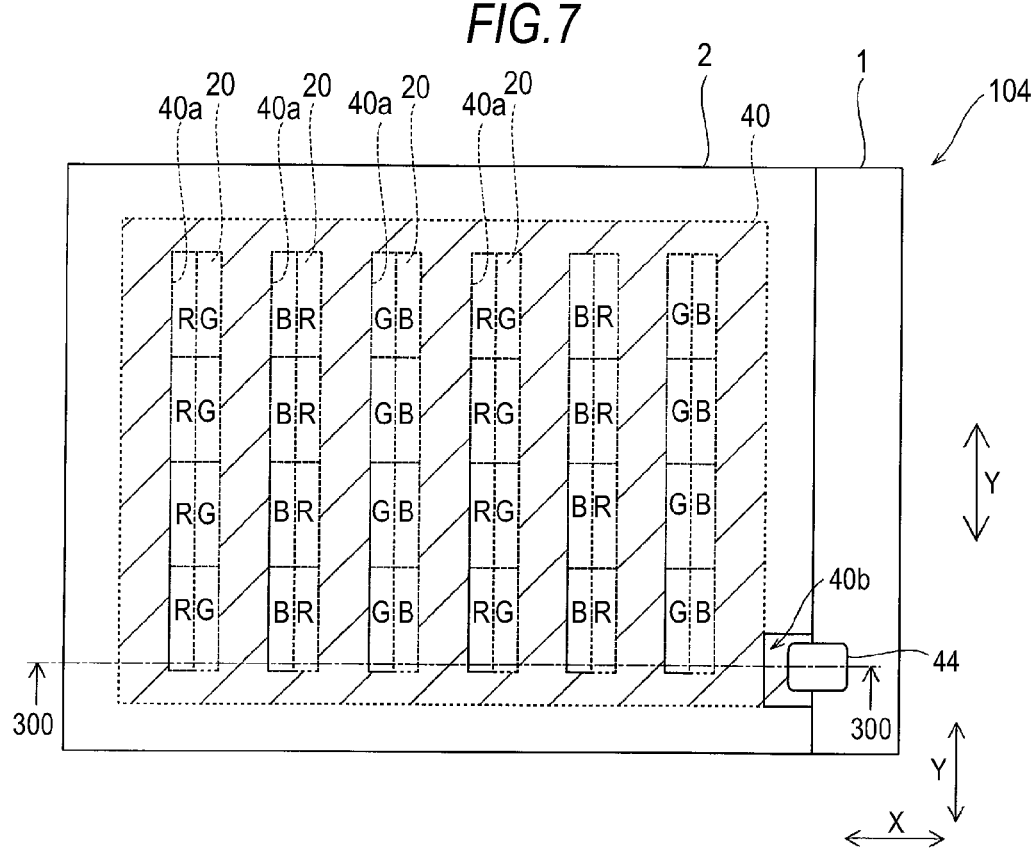
FIG. 7 is a top plane view of a liquid crystal display device according to a fifth embodiment.
Figure 8:
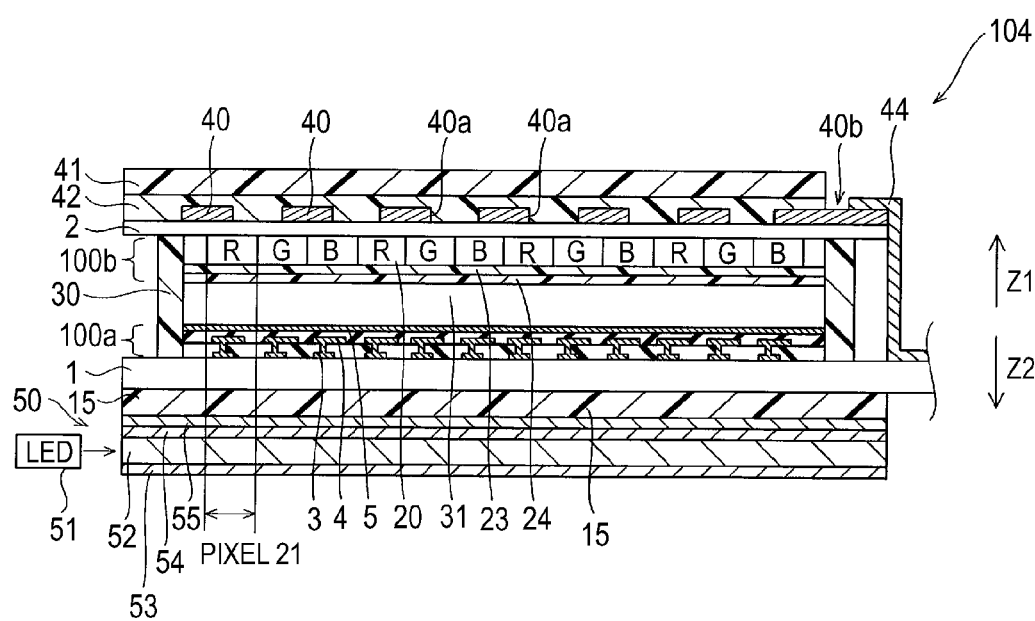
FIG. 8 is a cross-sectional view taken along line 300-300 of FIG. 7.

In a liquid crystal display device 104 according to a fifth embodiment, as shown in FIG. 7, the parallax barrier pattern 40 formed on the surface of the Z1 direction side of the CF substrate 2 has a plurality of opening portions 40a and is formed of a metallic layer such as chrome (Cr), aluminum (Al), silver (Ag) or nickel (Ni). Furthermore, the parallax barrier pattern 40 is formed on the surface of the Z1 direction of the CF substrate 2 using a sputtering method or a vapor deposition method. Furthermore, as shown in FIG. 8, the parallax barrier pattern 40 includes a barrier layer exposure portion 40b in which a part of an outer peripheral portion of the parallax barrier pattern 40 is exposed. In addition, on the surface of the Z1 direction side of the parallax barrier pattern 40b, the protective film 42 and the polarizing plate 41 are not formed. Furthermore, the barrier layer exposure portion 40b is electrically connected to a wiring provided at the TFT substrate 1 side by a conduction member 44 formed of a conductive adhesive layer, a metal wiring or the like, and is grounded. Furthermore, the parallax barrier pattern 40 has the function as a shield layer for shielding static electricity and the like from the Z1 direction side of the CF substrate 2, and can protect the liquid crystal display device 104 from the static electricity. Furthermore, the configuration is such that the static electricity charged to the parallax barrier pattern 40 as the shield layer escapes to the outside of the liquid crystal display device 104 via the conduction member 44. In addition, other configurations of the fifth embodiment are the same as those of the first embodiment.

In the fifth embodiment, as described above, by forming the parallax barrier pattern 40 as the metallic layer having a plurality of opening portions (slits) 40a which are directly formed on the surface of the CF substrate 2 at the side opposite to the thin film transistor 3 side and having the parallax barrier pattern 40 conduct to the TFT substrate 1 side, the static electricity from the outside of the liquid crystal display device 104 can be shielded by the parallax barrier pattern 40 formed of the metallic layer and can escape to the TFT substrate 1 side. As a result, since it is not necessary to provide a shield layer separately from the parallax barrier pattern 40 on the surface of the CF substrate 2 in the Z1 direction side of the thin film transistor 3, the number of the components can be reduced accordingly and the structure of the liquid crystal display device 104 can be simplified.

Furthermore, in the fifth embodiment, as described above, the barrier layer exposure portion 40b of the parallax barrier pattern 40 and the conduction member 44 for conducting to the TFT substrate 1 side are included, whereby the parallax barrier pattern 40 can be easily connected to the conduction member 44, and the static electricity can easily escape to the TFT substrate 1 via the parallax barrier pattern 40.

In addition, other effects of the fifth embodiment are the same as those of the first embodiment.

APPLICATION EXAMPLE

Figure 9:
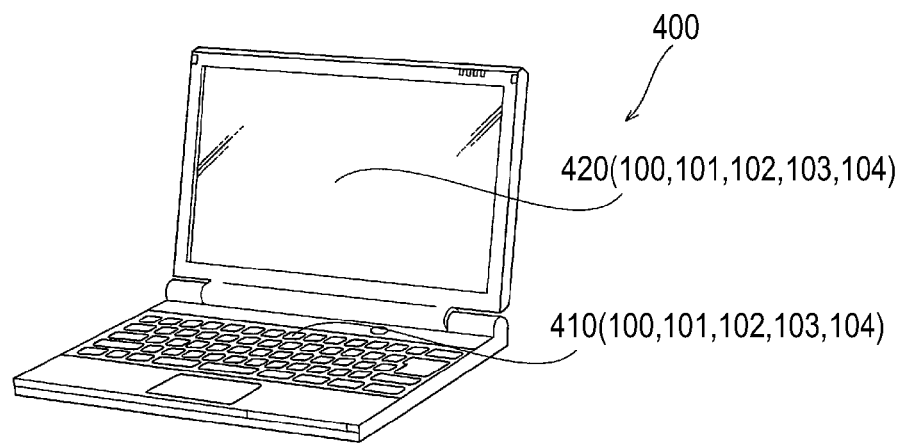
FIG. 9 is a diagram for explaining a first example of an electronic apparatus using the liquid crystal display device according to the first to fifth embodiments of the present application.
Figure 10:
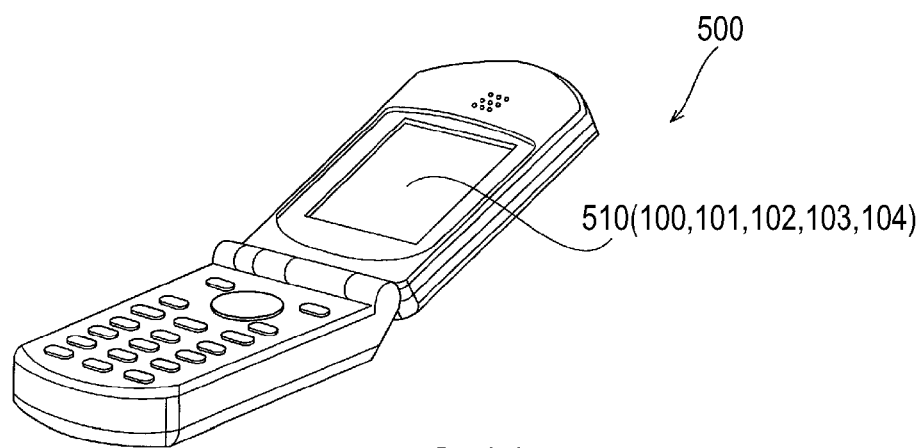
FIG. 10 is a diagram for explaining a second example of an electronic apparatus using the liquid crystal display device according to the first to fifth embodiments of the present application.
Figure 11:
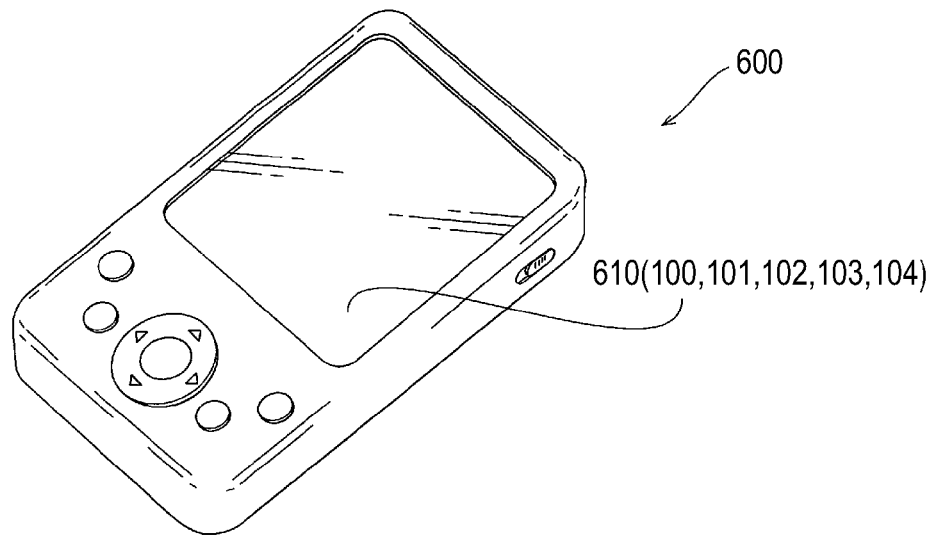
FIG. 11 is a diagram for explaining a third example of an electronic apparatus using the liquid crystal display device according to the first to fifth embodiments of the present application.

FIGS. 9 to 11 are drawings that explain first to third examples of an electronic apparatus using the liquid crystal display devices 100, 101, 102, 103, and 104 according to the present application, respectively. With reference to FIGS. 9 to 11, an electronic apparatus using the liquid crystal display devices 100 to 104 according to the first to fifth embodiments of the present application will be described.

As shown in FIG. 9, the liquid crystal display devices 100 to 104 according to the first to fifth embodiments of the present application can be used in a PC (Personal Computer) 400 as a first example, a mobile phone 500 as a second example, a portable information terminal 600 (PDA: Personal Digital Assistants) as a third example or the like.

In the PC 400 according to the first example of FIG. 9, the liquid crystal display devices 100 to 104 according to the first to fifth embodiments of the present application can be used in an input portion 410 such as a keyboard, a display screen 420 or the like. In the mobile phone 500 according to the second example of FIG. 10, the liquid crystal display devices 100 to 104 according to the first to fifth embodiments of the present application can be used in the display screen 510. In the portable information terminal 600 according to the third example of FIG. 11, the liquid crystal display devices 100 to 104 according to the first to fifth embodiments of the present application can be used in a display screen 610.

In addition, in the present embodiment as laid out here, all points should not be considered as limited by the examples. The scope of the present application is shown not by the description of the embodiment mentioned above but by the appended claims, and the meaning equivalent to the appended claims and all the modifications within the appended claims are included.

For example, in the first to fifth embodiments, the liquid crystal display devices have been shown as an example of the display device according to the present application, but the present application is not limited thereto. For example, the present application may be used in a display device such as an EL (Electro Luminescence) device.

Moreover, in the first to fourth embodiments, the liquid crystal display devices of the transverse electric field have been shown as an example of the display device according to the present application, but the present application is not limited thereto. For example, a liquid crystal display device of a longitudinal electric field may be used.

Furthermore, in the fifth embodiment, the example, in which the parallax barrier pattern and the TFT substrate side are electrically connected to each other by the conduction member, has been described, but the present application is not limited thereto. For example, a transparent electrode such as ITO may be formed on the surface of the parallax barrier at the side opposite to the liquid crystal layer and the transparent electrode may be electrically connected to the TFT substrate side by the conduction member. In this case, the parallax barrier pattern may be formed of resin and the transparent electrode may function as the shield layer.

Furthermore, in the first to fifth embodiments, the example, in which a plurality of rectangular opening portions are provided in the parallax barrier pattern, has been described, but the present application is not limited thereto. For example, the parallax barrier pattern may be formed in a step barrier pattern in a checkerboard pattern when seen in the plane view, a plurality of circular opening portions may be provided in the parallax barrier pattern, or the opening portion of the parallax barrier pattern may be formed in an inclined stripe barrier pattern provided in a step shape (obliquely).

Furthermore, in the first to fourth embodiments, the example, in which the opening portion (the slit) with a substantially rectangular shape is provided in the parallax barrier pattern, has been described, but the present application is not limited thereto. For example, the parallax barrier pattern may be formed in long thin strips. In this case, the light is shielded by the parallax barrier pattern in a long thin strip shape.

Moreover, in the first to fifth embodiments, the example, in which the end portion of the parallax barrier pattern is formed at the inside from the end portion of either substrate of the CF substrate or the opposing substrate with the parallax barrier pattern formed thereon, has been described, but the present application is not limited thereto. For example, the end portion of the parallax barrier pattern may be provided up to the end portion of either substrate of the CF substrate or the opposing substrate with the parallax barrier pattern formed thereon.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display device comprising:
   an element substrate having a transistor element formed on a surface thereof;
   an opposing substrate which is disposed to face the element substrate;
   a parallax barrier pattern which is directly formed on a surface of the opposing substrate at the side opposite to the transistor element side, a surface of the parallax barrier pattern directly contacting the surface of the opposing substrate; and
   a color filter layer formed on the opposing substrate at the side opposite to the parallax barrier pattern, the color filter including color filters for three different colors,
   wherein the parallax barrier pattern includes a plurality of openings, each opening configured such that two of the three different colored filters can be ascertained through said opening,
   wherein a thickness of the opposing substrate is smaller than that of the element substrate, and
   wherein the parallax barrier pattern is formed after the opposing substrate is bonded to the element substrate.

2. The display device according to claim 1,
   wherein the end portion of the parallax barrier pattern is formed further to at the inner side than the end portion of the opposing substrate.

3. The display device according to claim 1, further comprising:
   a protective film that is formed directly on a surface of the of parallax barrier pattern at the side opposite to the transistor element, and
   a polarizing plate that is formed directly on a surface of the protective film at the opposite side to the transistor element.

4. The display device according to claim 1, further comprising:
   a polarizing plate that is formed directly on a surface of the of parallax barrier pattern at the side opposite to the transistor element, and
   a protective film that is formed directly on a surface of the polarizing plate at the opposite side to the transistor element.

5. The display device according to claim 1,
   wherein the parallax barrier pattern is formed of either a metallic layer or a resin layer.

6. The display device according to claim 5,
   wherein the parallax barrier pattern is formed of a metallic layer having a plurality of opening portions which are directly formed on the surface of the opposing substrate at the side opposite to the transistor element side and is conducted to the element substrate side.

7. The display device according to claim 6,
   wherein a part of the parallax barrier pattern is configured to be exposed, and wherein a conduction member for conducting the exposed portion of the parallax barrier pattern to the element substrate side is further included.

8. An electronic apparatus including the display device according to claim 1.

9. The display device according to claim 1,
wherein the display device is configured to display two different images in a two screen display mode by separating an image.

10. The display device according to claim 1,
wherein a polarizing plate is formed to allow a surface of the polarizing plate to directly contact a surface of the parallax barrier pattern.

11. The display device according to claim 1,
wherein a protective film is formed to allow a surface of the protective film to directly contact a surface of the parallax barrier pattern, and a polarizing plate is formed to allow a surface of the polarizing plate to directly contact a surface of the protective film.

12. The display device according to claim 1,
wherein the parallax barrier pattern is formed to directly contact the
surface of the opposing substrate without an adhesive layer.

* * * * *